US008696460B2

(12) United States Patent
Odinot et al.

(10) Patent No.: US 8,696,460 B2
(45) Date of Patent: Apr. 15, 2014

(54) GAME CONTROLLER WITH AT LEAST ONE INTERMEDIARY LOCKING POSITION

(75) Inventors: Catherine Odinot, Seynod (FR); Guillaume Leleve, Gourhel (FR); Patrick Pennaneac'h, Chateaubourg (FR)

(73) Assignee: Guillemot Corporation S.A., Chantepie Cedex (FR)

( * ) Notice: Subject to any disclaimer, the term of this patent is extended or adjusted under 35 U.S.C. 154(b) by 431 days.

(21) Appl. No.: 13/034,890

(22) Filed: Feb. 25, 2011

(65) Prior Publication Data

US 2011/0212780 A1 Sep. 1, 2011

(30) Foreign Application Priority Data

Feb. 26, 2010 (FR) ...................................... 10 51425

(51) Int. Cl.

*A63F 9/24* (2006.01)
*A63F 13/00* (2006.01)
*G06F 17/00* (2006.01)
*G06F 19/00* (2011.01)

(52) U.S. Cl.

USPC .............. 463/37; 463/20; 463/25; 273/129 R; 273/238; 273/317; 446/139

(58) Field of Classification Search

USPC ............ 463/37, 20, 25; 273/129 R, 317, 238; 446/139

See application file for complete search history.

(56) References Cited

U.S. PATENT DOCUMENTS

| | | | | |
|---|---|---|---|---|
| 3,556,525 | A * | 1/1971 | Loren | 273/238 |
| 4,253,090 | A * | 2/1981 | Storie et al. | 340/323 R |
| 4,429,876 | A * | 2/1984 | Halliburton et al. | 273/121 A |
| 6,837,769 | B1 * | 1/2005 | Skov et al. | 446/139 |
| 2009/0058686 | A1 * | 3/2009 | Chaillou et al. | 341/20 |

* cited by examiner

*Primary Examiner* — Adetokunbo O Torimiro

(74) *Attorney, Agent, or Firm* — Blakely Sokoloff Taylor & Zafman

(57) ABSTRACT

A game controller having at least one arm mobile in relation to a base over a nominal range of displacement between two extreme positions, which implements a stopping mechanism of the aim 1n an intermediary locking position between the extreme positions to avoid reaching involuntarily a zone of the nominal range of displacement. An element of the stopping mechanism is removable and/or retractable with respect to the base so that this element is able to take two positions, an active position, wherein the stopping mechanism in the intermediary locking position is active and cooperates with the base and the arm, and an inactive position, wherein the stopping mechanism is inactive. The game controller also implements mechanical means of crossing the intermediary locking position under the action of a specific control carried out by a user when the stopping mechanism is active.

14 Claims, 9 Drawing Sheets

GAME CONTROLLER WITH AT LEAST ONE INTERMEDIARY LOCKING POSITION

FIELD OF THE INVENTION

The field of the invention is that of equipment and accessories for interactive leisure activities for micro-computers and game consoles. More precisely, the invention relates to a game controller intended in particular, but not exclusively, to be used with a flight simulation software.

BACKGROUND

It is known to use, in order to control video games, different types of interfaces, in particular in the form of controllers and joysticks, according to the applications and needs, and generally with the objective to come as close as possible to reality. As such, in order to pair with a video game, and in particular flight simulations, the user can have a joystick, having a stick, and a controller making it possible to control the power of the means of propulsion, for example the power of engines, called "throttle".

The Applicant distributes for example such devices, and in particular products of the Hotas range (registered trademark).

Conventionally, such a throttle comprises one or several arms or levers. Each arm is mobile according to a single direction, and for example mounted pivoting around an axis on a base allowing the user to vary the power of the simulated engine (or an analogous characteristic) according to the angle that the min forms in relation to its base.

Certain throttles can comprise several mobile arms which can be integral or non-integral via a lock (for example, two arms for the throttle of a twin-engine fighter aircraft). The two arms can therefore change either in parallel (in order to vary the power of the simulated engines), or independently (in order to separately control the speed of the engines). The throttle can therefore comprise one arm per engine.

The two extreme positions, corresponding to the start and to the end of the travel, and which correspond respectively, in the simulation, to the stopping of the engines (position called "idle") and to the maximum power of the engines, are defined by stop zones formed in or fixed to the support. For example a rail or a slideway with a circular arc can be provided, wherein a lug integral with the mobile arm in rotation is displaced.

In simulations, the start of travel of the lever of the throttles therefore generally represent the start of the combustion of the gases (if it entails a jet aircraft simulation) and the end of travel represents the maximum power, with, if the simulation and/or the aircraft which is simulated so provide, afterburner.

These two start of travel and end of travel zones are sometimes difficult to control, for the user or the player.

As such, during the simulation, it may occur that the user wanting to slow down too strongly returns the lever of the throttle to the start of travel and as such in error sends to the flight simulation software a gas cut-off signal. This can occur when the simulated aircraft is in full flight, which very often entails the stalled condition, and even the crash (virtual) of the latter.

Likewise, it can occur that the user, carried by his movement (during an acceleration), places his throttle level at the end of travel and involuntarily triggers afterburner, therefore accelerating more than planned. Here too, this can disturb the user in his simulation and result in the stalled condition (or the crash) of the craft that he is piloting.

In order to overcome this problem, prior art provides throttles comprising braking systems of the mobile arm allowing the user to adjust the resistance of the controller.

It is also known to use centre detent potentiometers, which allow the user to perceive in his gesture the detent of the potentiometer and as such to slow down his movement during the approach of the triggering zone of the afterburner for example.

A disadvantage with these throttles with centre detent potentiometers is the fact that the user, although he feels the resistance generated by the detent potentiometer, is required to slow down his gesture at the approach of one of the extreme positions if he does not want to trigger either the stopping of the combustion or the triggering of the afterburner.

Another disadvantage with these throttles with centre detent potentiometers resides in the fact that the detent cannot be deactivated. Indeed, simulations and/or certain simulated aircraft do not all necessarily provide afterburner, yet a user who is using a throttle with detent potentiometer during the simulation of an aircraft that does not include afterburner still feels the detent.

OBJECTIVES OF THE INVENTION

The invention in particular has for objective to overcome these disadvantages of prior art.

More precisely, the invention has for objective to provide a game controller increasing the realism and the safety (virtual) of video games and in particular of flight simulation video games.

The invention further has for objective, according to at least one embodiment, to provide users with more realism, safety (virtual) and precision in the simulations relative to aircraft that are provided or not provided with afterburner.

Another objective of the invention is to provide such a game controller, of which the modifications in relation to prior art are simple and inexpensive to implement.

SUMMARY OF THE INVENTION

These objectives, as well as others which shall appear in what follows, are achieved using a game controller having at least one arm mobile in relation to a base, over a nominal range of displacement between two extreme positions, referred to as minimum position and maximum position respectively.

According to the invention, said controller implements at least one stopping mechanism of said at least one arm in an intermediary locking position, between said extreme positions, having a first contact surface integral with said base able to cooperate with a second contact surface integral with said at least one arm, in such a way as to define a reduced range of displacement of said at least one arm in relation to said nominal range of displacement, and means of crossing of said intermediate position, able to take at least two states:

- a stop-state, wherein said first and second contact surfaces come into contact with each other, in said intermediary locking position;
- a crossed-state of said intermediary locking position, wherein said first and second contact surfaces are separated from each other by a predetermined action of the user, in order to allow said at least one arm to be displaced over an additional range of displacement of said reduced range of displacement, and said at least one of said contact surfaces is formed over a removable and/or retractable element that is able to take two positions, an active position, wherein said stopping mechanism in an intermediate position is active, and an inactive position, wherein said stopping mechanism is inactive.

As such, the invention propose a game controller of which the travel of the mobile arm is divided mechanically into several (at least two) zones by a stopping, or blocking, mechanism, in intermediate position. Specific complementary mechanical means are provided, in order to make possible the crossing of the intermediate position, under the action of a specific control carried out by the user or player. In this way, the arm can be displaced over an additional range of displacement, but cannot reach it directly, accidentally.

The stopping, or blocking, mechanism in intermediate position implements a removable and/or retractable element that is able to take two positions, i.e. an active position, wherein said stopping mechanism in an intermediate position is active, and an inactive position, wherein said stopping mechanism is inactive.

The removable and/or retractable element may be removable and/or retractable either in relation to the base, or in relation to the arm. The element is removable from the base and/or retractable in relation to the base if the first contact surface is formed on this element (indeed, the first contact surface is integral with the base in said intermediary locking position, which is not necessarily the case in another position). The element is removable from the arm and/or retractable in relation to the arm if the second contact surface is formed on this element (indeed, the second contact surface is integral with the arm in said intermediary locking position).

If the simulation used by the player does not requires the locking of the arm in an intermediate position, the user can remove this element from the base of the controller (if said first contact surface is integral with the base) or from the arm (if said first contact surface is integral with the arm), and put it aside (inactive position), by putting away from the controller for example.

In an inactive position, the use of crossing means by the player, although possible, is thus not required (indeed, the withdrawal of this element has eliminated this intermediary locking position since the contact surfaces cannot cooperate with one another). The player can re-introduce the element in the base (active position) if the simulation used requires the locking of the arm in an intermediate position. In the active position, the player thus needs to use the crossing means if he is blocked in the locking intermediary position and wishes to cross this position.

In other words, the element is removable and may be removed from the base or positioned in the base as required.

Alternatively or in addition, the element may be retracted either sideways or vertically in the base or in the arm, in order not to contitute an obstacle to the displacement of the mobile arm in relation to the base (inactive position). The element may for example be pushed manually inside the base. The player can 'spread out' the retracted element by acting on a control button and renders it active, the element taking back its active position under the force of a spring for example.

In particular, said removable and/or retractable element can be mounted reversibly in said base.

Inversely, said removable and/or retractable element can be mounted reversibly in said arm, in such a way as to be able to take two positions, an active position, wherein said stopping mechanism in an intermediate position is active, and an inactive position, wherein said stopping mechanism is inactive.

According to a particular embodiment, said second contact surface is mobile according to an axis parallel to an axis defined by said at least one arm.

In particular, said at least one arm comprises two portions connected by a slide joint, a first portion corresponding to a shaft of said arm and a second portion carrying an actuating element of said means of crossing, allowing for the passing from said stop-state to said crossed-state, means of recalling tending to return said means of crossing into said stop-state.

Said at least one arm can be mounted mobile in rotation in relation to said base.

Likewise, said at least one arm can be mounted mobile in translation in relation to said base.

According to a particular embodiment, said second contact surface is formed by one of the elements belonging to the group including:

- a portion of the body of said at least one arm;
- a lug formed on said at least one arm;
- a bolt carried by said at least one arm;
- a latch carried by said at least one arm;
- a roller integral with said at least one arm;
- a portion integral with said base;
- a lug formed on said base;
- a bolt carried by said base;
- a latch carried by said base;
- a roller integral with said base.

A lug can as such in particular by provided on the base and a rail on the mobile arm with a cam path on the rail.

According to a particular embodiment, the throttle can include two stopping mechanisms, for each arm.

As such, in a particular embodiment, the throttle can include:

- a first stopping mechanism in the vicinity of a minimum position corresponding to the simulation of a stopping of the engines, and making it possible to avoid the simulation of an inopportune ignition and/or extinction of the engines;
- a second stopping mechanism in the vicinity of a maximum position, making it possible to simulate afterburning.

According to a particular aspect, the game controller can include, for at least one of said arms, a Hall effect unit for detecting the movement of said arm, for example in the form of a magnet integral with the arm (or with each arm), associated with a sensor (or two sensors, if there are two arms) mounted fixed in the base of the controller.

Moreover, such a controller can include means of applying a force by friction on said at least one arm, opposing the displacement of the latter, and in particular of such means which can be adjusted.

This aspect can in particular be implemented by the intermediary of a thumbwheel, which controls the contact force of a pad on a friction surface of an arm, by the intermediary of a worm screw.

Note that this characteristic can be implemented on a controller independently of the aspects presented hereinabove.

According to a particular embodiment, the controller comprises two arms, and means for rendering said arms integral/non-integral, in such a way that their displacements can be linked or independent.

As such, the user can select between two control modes, the two handles being either linked in displacement, or able to be displaced independently in relation to one another.

Finally, according to a particular embodiment, said removable and/or retractable element comprises at least one grasping zone.

BRIEF DESCRIPTION OF THE DRAWINGS

Other characteristics and advantages of the invention shall appear more clearly when reading the following description of a preferred embodiment, which is non-restrictive and provided simply for the purposes of information, and of the annexed drawings, wherein.

DETAILED DESCRIPTION

A throttle for flight simulation or video game is generally constituted of a mobile throttle control arm in rotation in relation to a base, of which the travel is without obstacle, over a range of displacement extending between a minimum position (stopping of the engines, or "idle") and a maximum position (maximum power).

The principle of the invention is to divide into at least two phases (for example a gas cut-off phase, a uniform acceleration phase, and/or an afterburner phase) the acceleration of the simulated vehicle while still preventing an involuntary passage from one phase to the other. For this, the invention proposes to separate the range of displacement of the control arm into at least two sub-ranges, separated by one or two stopping mechanisms, or stops in this embodiment. The control is of course adapted to be able to cross these stops, subject to an additional action carried out by the user or the player. As such, the latter does not risk reaching an undesired zone of the range of displacement (typically zones in the vicinity of the minimum position or of the maximum position) involuntarily, for example caused by a movement that is too abrupt or too excessive.

In the following description of a throttle for video game or flight simulation software according to an embodiment of the invention, the expression "throttle" designates the device for controlling the throttle as a whole.

Figure 1:
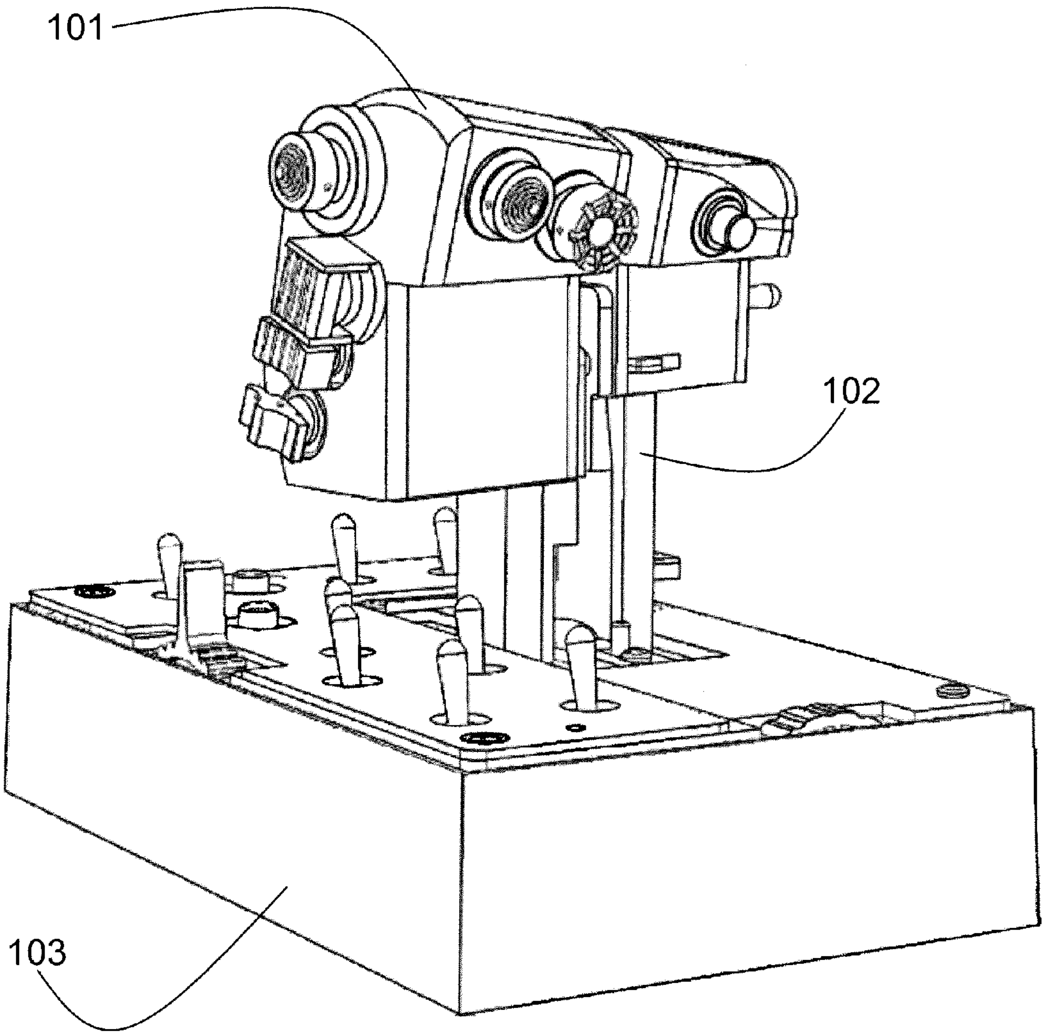
FIG. 1 is a view in perspective of an example of a game controller that can implement the invention, and comprising two mobile arms.

According to the cases, such a controller can include a single arm, making it possible to control all of the engines of the simulated craft, or two arms mounted in parallel, making it possible respectively to control the engine or engines of the left side and of the right side. FIG. 1 is a view in perspective of such a game controller with two mobile arms, implementing the invention, according to the embodiment described in what follows.

Such a controller therefore includes two arms 101, 102, allowing the gas to be controlled ("throttle"). It can be a part of a system for flight simulations, and can be accompanied by a stick.

Each arm 101, 102, of the throttle comprises at its top a handle which incorporates a substantial number of actuators, mini-sticks, buttons and switches in order to allow the pilot to control a maximum of items without releasing the controls of the craft: this is the "Hands on Throttle And Stick" concept.

The arms 101, 102 are mobile in relation to a base 103, also provided with various buttons and adjusting elements.

As explained in what follows, the two arms 101, 102 can be either integral, so that a single action controls all of the engines in an even manner, or non-integral, in order to be displaced independently in relation to one another.

Figure 2:
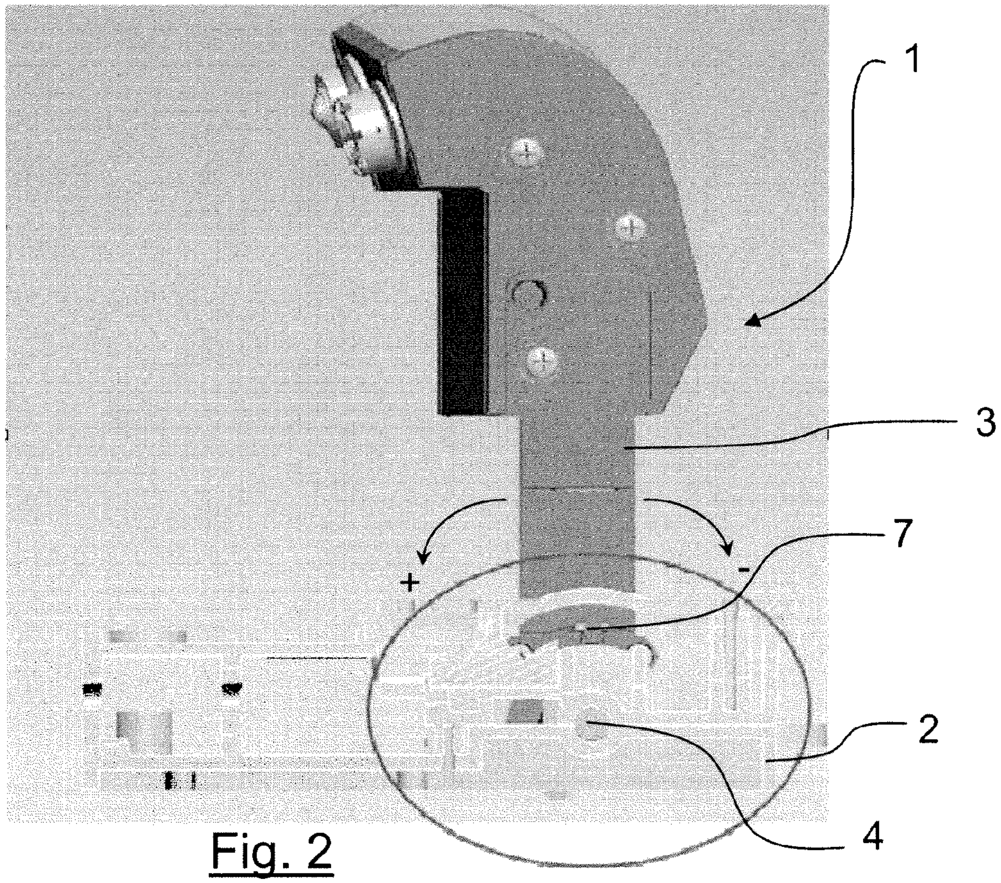
FIG. 2 is a partial cross-section view of one of the arms of the game controller of FIG. 1, according to an embodiment of the invention.

FIG. 2 is a partial cross-section view of one of the arms of the game controller of FIG. 1. This can also be, in the case of a simpler controller with a single arm, the single arm of such a controller.

This game controller is therefore described in what follows within the framework of a use as a throttle in a flight simulation video game. Of course, this game controller can be used in other types of video games, for example in order to simulate the control of a land or sea vehicle.

As shown in FIG. 2, the throttle 1 comprises a base 2 whereon is mounted mobile in rotation an arm 3 according to an axis 4 of rotation. The mobile arm 3 can be displaced by a user over a nominal range of displacement delimited by two extreme positions (visible in FIG. 3), i.e. a minimum position 5, corresponding to the stopping of the engine or engines and a maximum position 6, corresponding to a maximum power of the engines.

Figure 3:
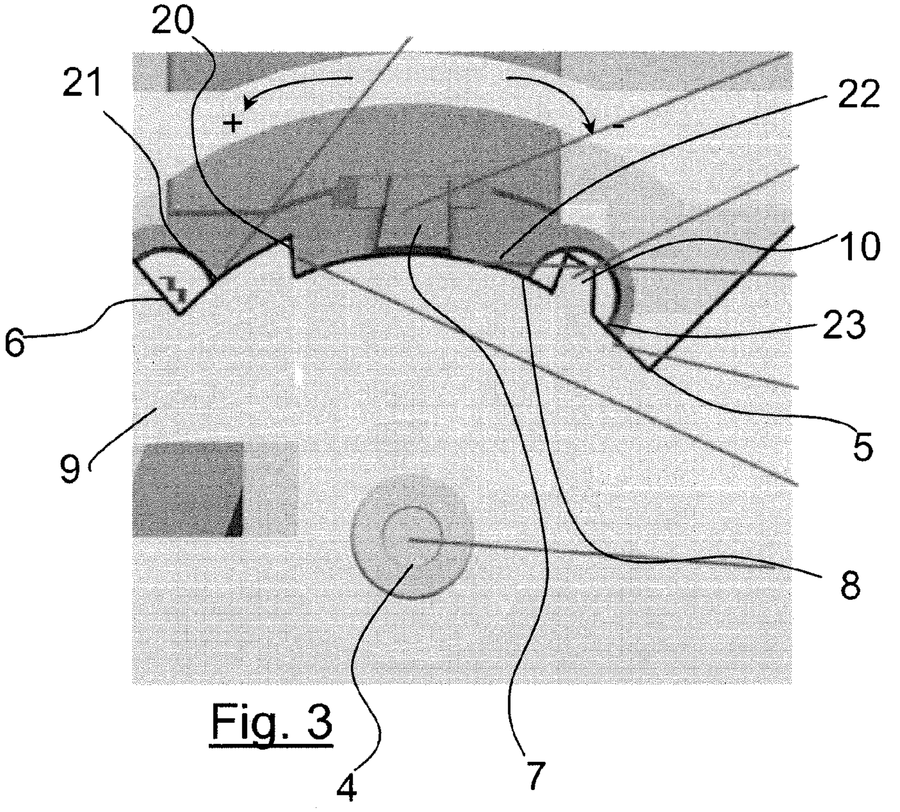
FIG. 3 is a detailed view of the encircled portion of FIG. 2.

The mobile arm 3 is provided with a lug 7 of which the lower surface hugs the shape of the surface 8 of displacement of the base 2, defining a guide rail for the lug. This lug 7 can therefore be displaced along the surface 8 between the minimum position 5 and the maximum position 6 according to whether the arm 3 is displaced according to the "+" or "−" direction of displacement. In FIGS. 2 and 3, the lug 7 is in the default position (in other words, its lower surface is in contact with, or slightly separated from, the surface 8) and is substantially located between the two extreme positions 5, 6.

In the embodiment described in relation with FIGS. 2 and 3, the base 2 (and more precisely the surface forming the rail 8) is provided with two intermediary stops, i.e. a first stop 10 (called the "gas cut off" stop) and a second stop 20 (called the "afterburner" stop) able to cooperate with the lug 7 of the arm 3 and defining two intermediary locking positions of the lug 7 (and therefore of the arm 3) in the vicinity of the extreme positions 5, 6.

The use of two stops makes it possible to obtain three zones, or sub-ranges, for the operation of the throttle, i.e. a zone 21 called "afterburning", a zone 22 called "progressive acceleration" and a zone 23 called "gas cut off".

Figure 5:
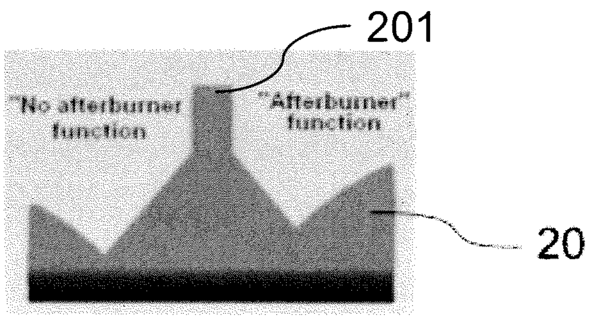
FIG. 5 shows an example of a removable and reversible stopping mechanism implemented in the game controller of FIG. 2 (the stopping mechanism is represented here when removed from the base)
Figure 6:
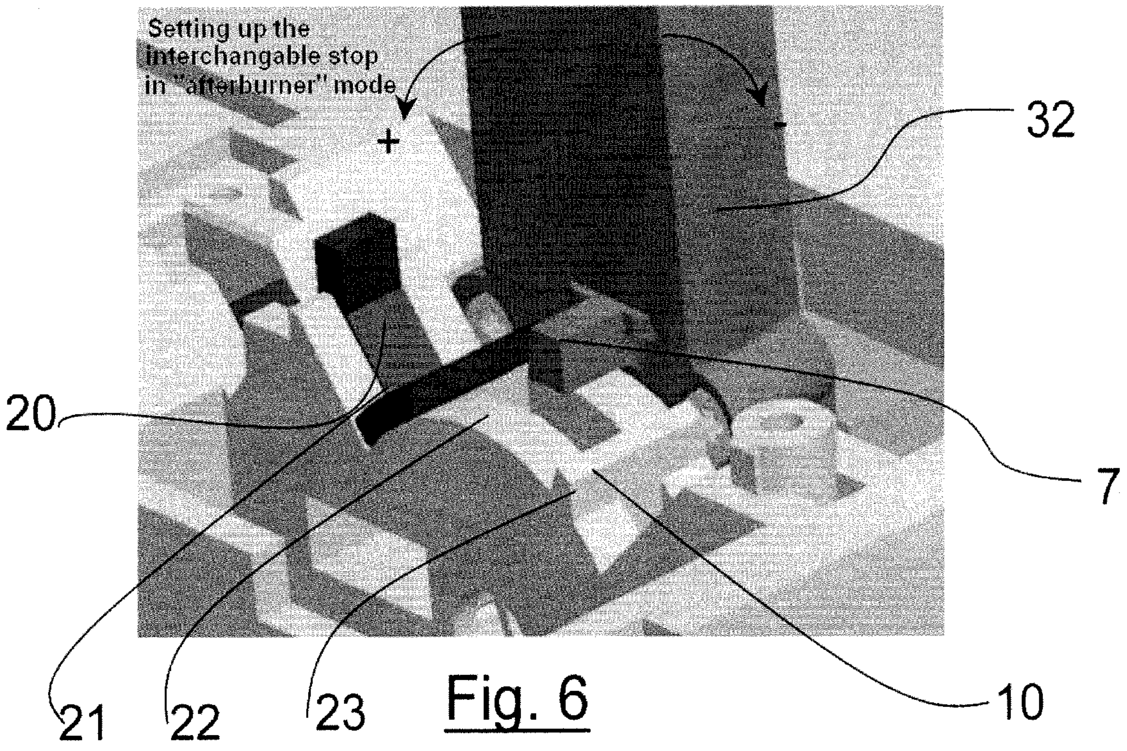
FIGS. 6 and 7 are views in perspective showing the example of the reversible stopping mechanism implemented in the game controller of FIG. 2, in two positions of use.
Figure 7:
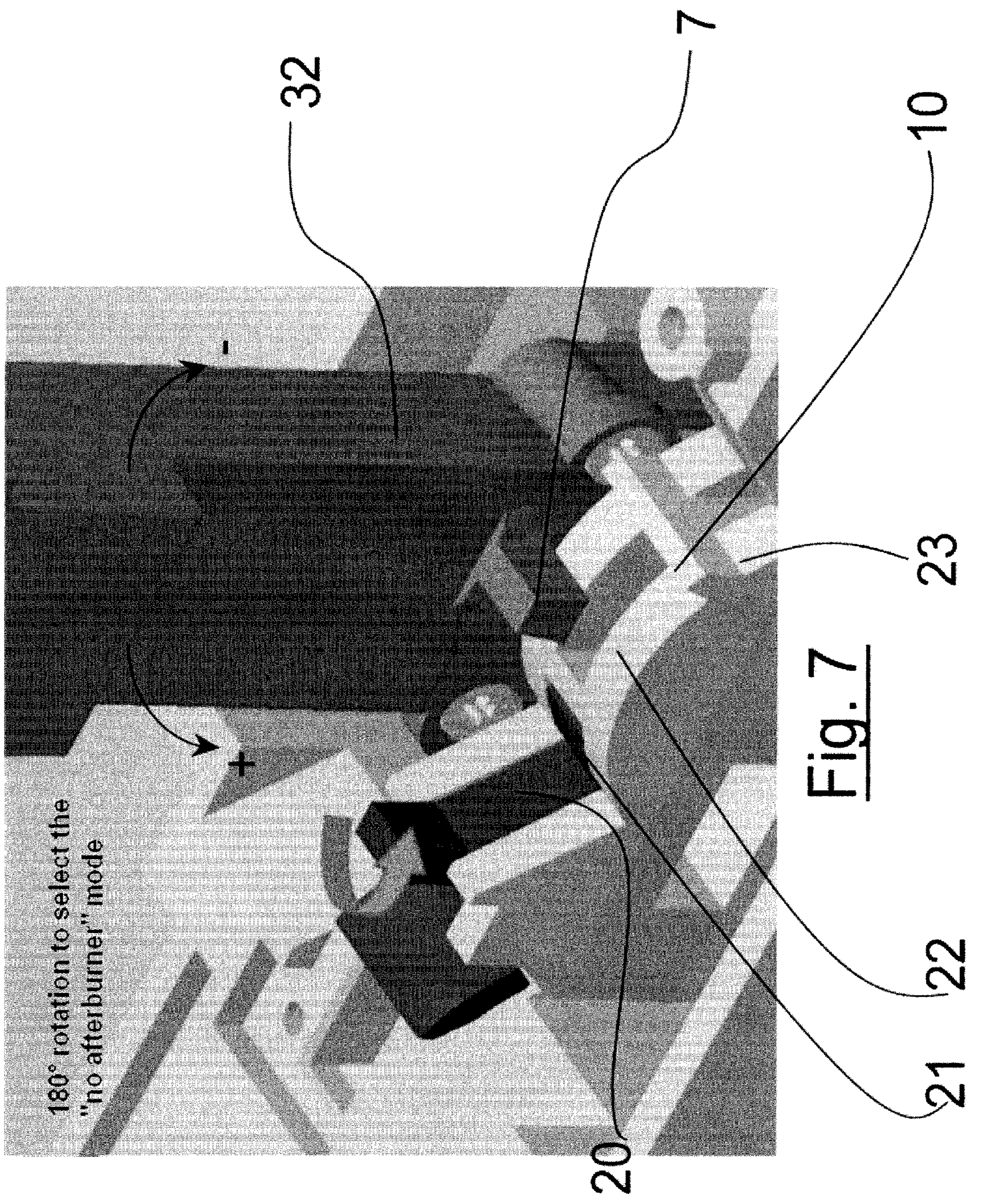

In this example, the first stop 10 is fixed and the second stop 20, which shall be described in more detail in relation with FIGS. 5 to 7 can be removed and/or retracted. According to the embodiments, it is possible that the two stops be fixed, removable or retractable, or that a single one of the two stops is present.

When the mobile arm 3 is displaced and the lug 7, which is then located in a default position (position that it taken when no action other than the displacement in rotation is exerted), enters into contact with one of the stops 10, 20, the mobile arm is then blocked in rotation. As such, during flight simulation (i.e. after having started the engines, as explained hereinafter), the user can displace the arm only over a reduced range, excluding the gas cut-off and afterburner zones. He remains in the progressive acceleration zone, and must carry out an additional manipulation in order to reach the other two zones.

As such, the crossing of the stop by the lug 7, in order to continue the movement of the mobile arm 3 in its travel and switch to afterburner or gas cut off, is accomplished via an action of the user on the mechanical means of crossing which allow the lug to leave its default position.

Figure 4:
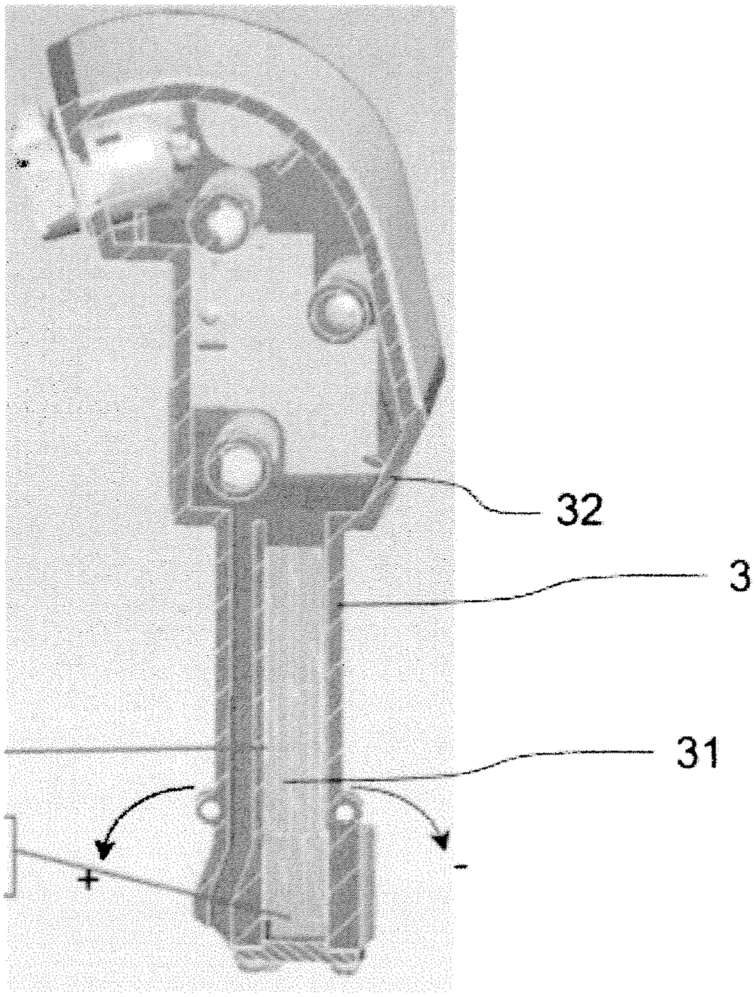
FIG. 4 shows, as a cross section, the slideway mechanism of the arm of FIG. 2, allowing the lug to be controlled.

According to the embodiment of the invention shown in FIG. 4, the mobile arm 3 comprises two portions connected together by a slide joint. A first portion 31 is the shaft of the mobile arm with a pivot connection in relation to the axis of rotation and a second portion 32 is the handle (more generally the outside shell) of the mobile arm whereon is fixed the lug 7. Means of recalling (not shown) tend to return the lug 7 into a default position, wherein the crossing of said stops is not possible.

As such, when the lug 7 arrives in contact with one of the stops, it is up to the user to raise said handle if he wishes to continue the travel of the mobile arm 3. When the user raises the handle, said lug 7 leaves its default position (in contact or in the vicinity of the surface 8) and can pass over the stop with which it was in contact.

As can be seen in FIG. 3, the stop 10 is substantially punctual, and if, for example, the user raises said handle to switch from the zone 22 to the zone 23, the lug 7 returns in the extension of the zone 22, when it is located in the zone 23. This means that the arm 3 has returned to its idle position, under the effect of the means of recalling. As such, when the engines are cut off (zone 23), the user must cross the stop 10 in order to start the engines. There is no risk of an untimely start-up, and a specific action on the arm is required (lift and then push) in order to start.

On the other hand, the stop 20 remains raised over the entire zone 21. This allows the user to have a feeling of the afterburner via the arm (the handle is maintained in its actuation position of the lug). In addition, it is as such possible to decelerate directly, by pulling the arm, without having to carry out a specific action (contrary to what is carried out in order to start the engines).

According to an embodiment described in relation with FIGS. 5 to 7, the second stop 20 of which the profile is shown in FIG. 5 can be reversed and can be lodged in a housing 9 of the base according to two different positions:

- a position corresponding to FIG. 6, wherein the stop 20 is said to be “active”, i.e. it can enter into contact during the rotation of the mobile arm 3, with said lug 7, if the latter is placed in its default position in order to prevent the crossing of it;
- a second position corresponding to FIG. 7, wherein said retractable stop 20 is called “inactive”, i.e. it cannot enter into contact during the rotation of said mobile arm 3 with said lug 7 (even if the latter is placed in its default position). It has a surface that extends the surface 8.

To switch from one position to the other, the user, in this embodiment, extracts the retractable stop by pulling on the grasping zone 201, pivots it 180 degrees around a vertical axis and reintroduces it into the housing 9.

This allows the user to be able to have the stop 20 in its “inactive” position if the simulation that he is using does not provide “afterburner”.

Note that in FIGS. 2 and 3, the retractable stop is mounted in the base in active position.

In order to allow the lug 7 to cross the stops 10 and 20, in this embodiment, the invention therefore provides that the user raises a portion of the mobile arm 3.

However, other solutions can be considered in order to allow the lug to leave its default position, for example:

- a mechanical system (utilising for example a means of actuating located on the handle of the mobile arm) allowing the lug 7 to be displaced laterally in relation to the mobile arm 3 so that the lug 7 can no longer enter into contact with the stop 10 or 20;
- a mechanical system (utilising for example a means of actuating located on the handle of the mobile arm) allowing the lug 7 to be displaced longitudinally in relation to the mobile arm 3 so that the lug 7 can no longer enter into contact with the stop 10 or 20;
- a mechanical system making it possible to displace the entire mobile arm 3 laterally so that the lug 7 linked to the mobile arm 3 can no longer enter into contact with the stop 10 or 20;
- a mechanical system making it possible to pivot the entire mobile arm 3 around its longitudinal axis so that the lug 7 linked to the mobile arm 3 can no longer enter into contact with the stop 10 or 20;
- a mechanical system making it possible that it is the removable stop that is displaced (by translation or by rotation) by actuating a mechanical system either laterally or vertically, in order to no longer present an obstacle to the passing of the lug 7 (the stop is thus retractable).

According to another embodiment, the second stop 20 is removable and can:

- either be lodged in a housing 9 of the base, wherein the stop 20 is said to be “active”, i.e. it can enter into contact during the rotation of the mobile arm 3, with said lug 7, if the latter is placed in its default position in order to prevent the crossing of it;
- or removed from the housing 9 of the base, wherein the stop 20 is said to be “inactive”, i.e. it cannot enter into contact during the rotation of said mobile arm 3 with said lug 7.

Thus, if the simulation used by the player does not provide afterburner (as in the case of a simulation of the piloting of a civil aircraft or liner for example), the user can remove the stop 20 from the housing 9. Since the housing 9 is empty, there is no intermediary locking position for the afterburner (in other words, there is no security against the triggering of the afterburner).

Conversely, if the simulation used by the player does provide for afterburner (as in the case of a simulation of the piloting of a fighter plane for example), the user can insert the stop 20 in the housing 9 so that an intermediary locking position is created. When the stop 20 is correctly positioned in its housing 9, the lug 7 of the mobile arm 3 can enter into contact with the stop 20 when the arm 3 is rotated, provided that the lug is in its default position, thus creating an intermediary locking position.

Consequently, such a game controller increases the realism of the simulation. The simulation is realistic whatever the plane simulated by the video game.

Moreover, means for adjusting can be considered, in particular for the position and/or the height of the stops and/or of the lug.

According to a particular embodiment, the measuring of the displacement, and for example of the rotation, of each arm (or of the single arm according to the cases) is done by a Hall effect detection unit, implementing on the one hand at least one permanent magnet, and on the other hand at least one Hall effect sensor.

For example, in the case of a controller with two handles such as shown in FIG. 1, it can be provided that a magnet be integral with each arm, and is therefore mobile in relation to the base, whereto are fixed two sensors associated respectively to each arm.

Figure 8:
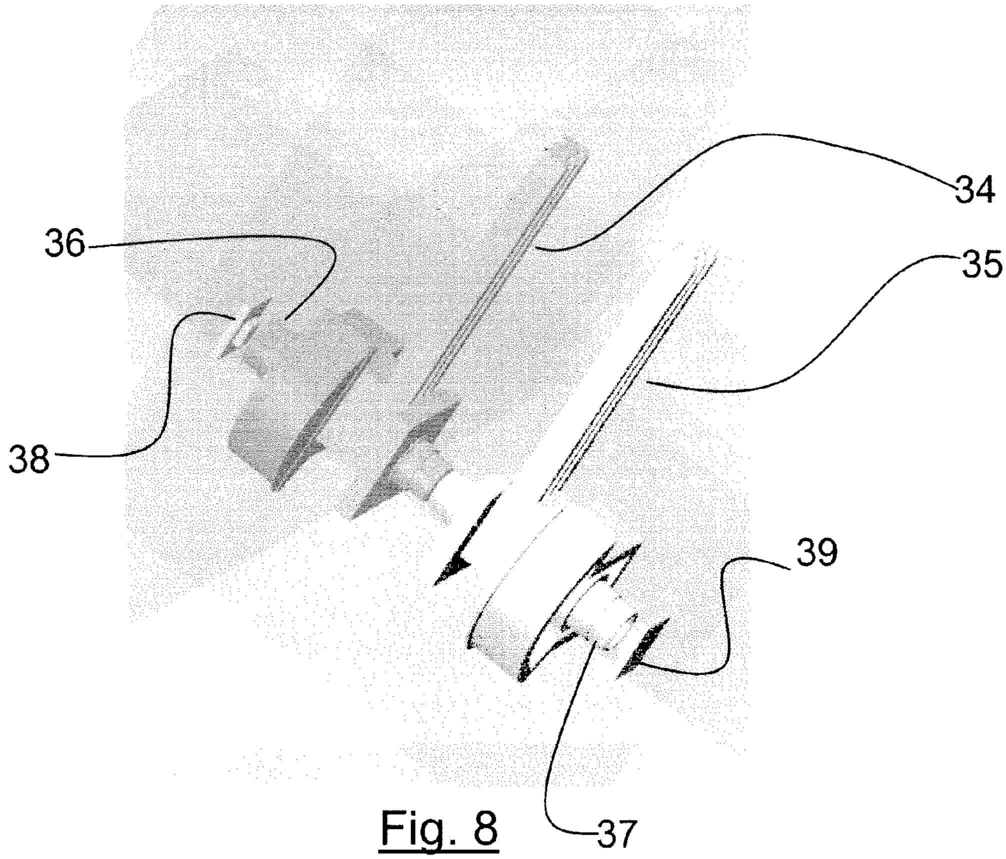
FIG. 8 is a view in perspective showing a portion of the two arms of the controller of FIG. 1.

FIG. 8 shows, in the case of such a game controller with two throttles, an example of mobile arms 34 and 35 associated to the two handles respectively. Permanent magnets 36 and 37 are fixed on the arms 34 and 35 respectively. Hall effect sensors 38 and 39 integral with the base are placed across from these magnets 36 and 37, in order to measure the position of the arm or arms in relation to the base.

Figure 9:
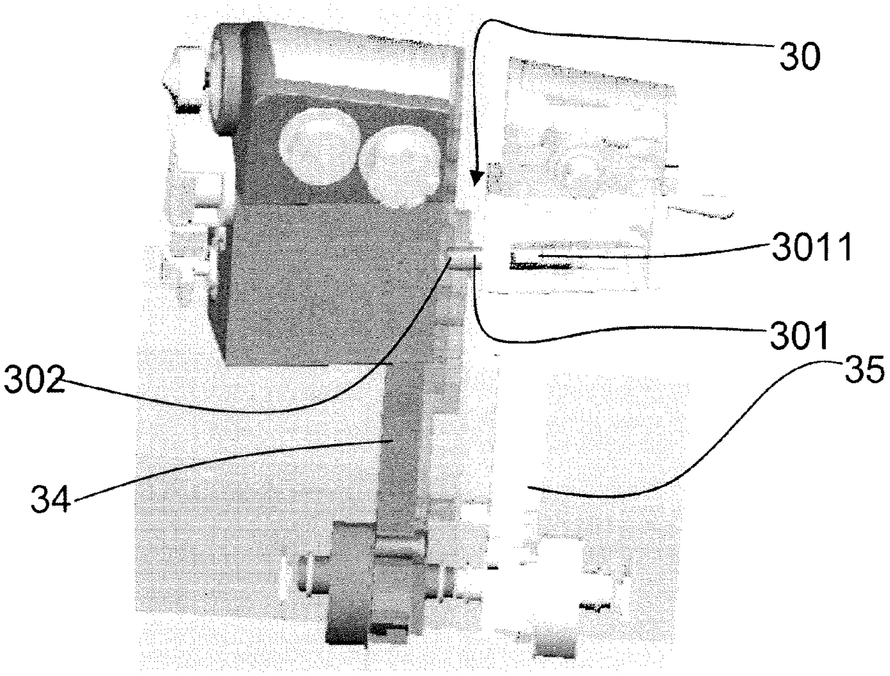
FIG. 9 is a view in perspective of the two arms of the controller of FIG. 1 and more particularly of the means of rendering these two arms integral.

As shown in FIG. 9, in this embodiment, means 30 are provided in order to render integral or not the two arms, according to the needs of the user. The latter has as such two simulation positions:

an integral position, wherein the two handles systematically follow the same movement (it is as such possible to act on a single handle to identically control the power of all the engines, for example in the case of the simulation of a twin-engine or four-engine craft);

a non-integral position, wherein the two handles can be displaced independently, which makes it possible for the user to control independently, for example the engine or engines on the left and the engine or engines on the right.

The means 30 can be comprised of a latch 301, of which the general shape is cylindrical, located on the handle associated to the mobile arm 35 able to be housed in a housing 302 intended to receive the end of the latch 301. This housing 302 is located on the handle associated to the mobile arm 34. The user actuates the latch 31 (in a transversal movement) by the intermediary of the transversal protrusion 3011.

More precisely, according to a particular embodiment, a lateral cover of one of the mobile arms 34 makes it possible to access a housing intended to receive the end of the latch. This housing is substantially cylindrical, but its mouth can be expanded in order to facilitate and/or guide the insertion of the end of the latch which protrudes from the other mobile arm 35. The latch consists for example of a cylinder carrying a transversal protrusion allowing for the grasping. The ends of the cylinder are more preferably chamfered. The cylinder comprises a circular shoulder arranged in the cylinder. This shoulder receives an O-ring seal. The mobile arm 35 comprises a cylindrical housing receiving the cylinder of the latch and an opening for the protrusion of the latch (grasping protrusion). The opening made in the mobile arm 35 has an "L" shape. The latch is mobile in rotation in this cylindrical housing and slidably mobile according to an axis that is substantially parallel to the axis of rotation of the mobile arms 34, 35. The protrusion of the latch presses against the walls of the opening, which limits the amplitude of the rotation of the latch and the amplitude of the sliding. The O-ring seal prevents undesired sliding.

According to another aspect of the invention, which can where applicable be implemented independently of the aspects described hereinabove, means for adjusting the force to be applied on the handle or handles in order to displace them can be provided. It is indeed necessary that a handle retain its position when the user releases it. For this, means applying a force of friction on the arm make it possible to maintain the position of the arm, and to apply a mechanical resistance.

Furthermore, according to this particular aspect, the user can adjust this friction force, according to his needs or habits.

Figure 10:
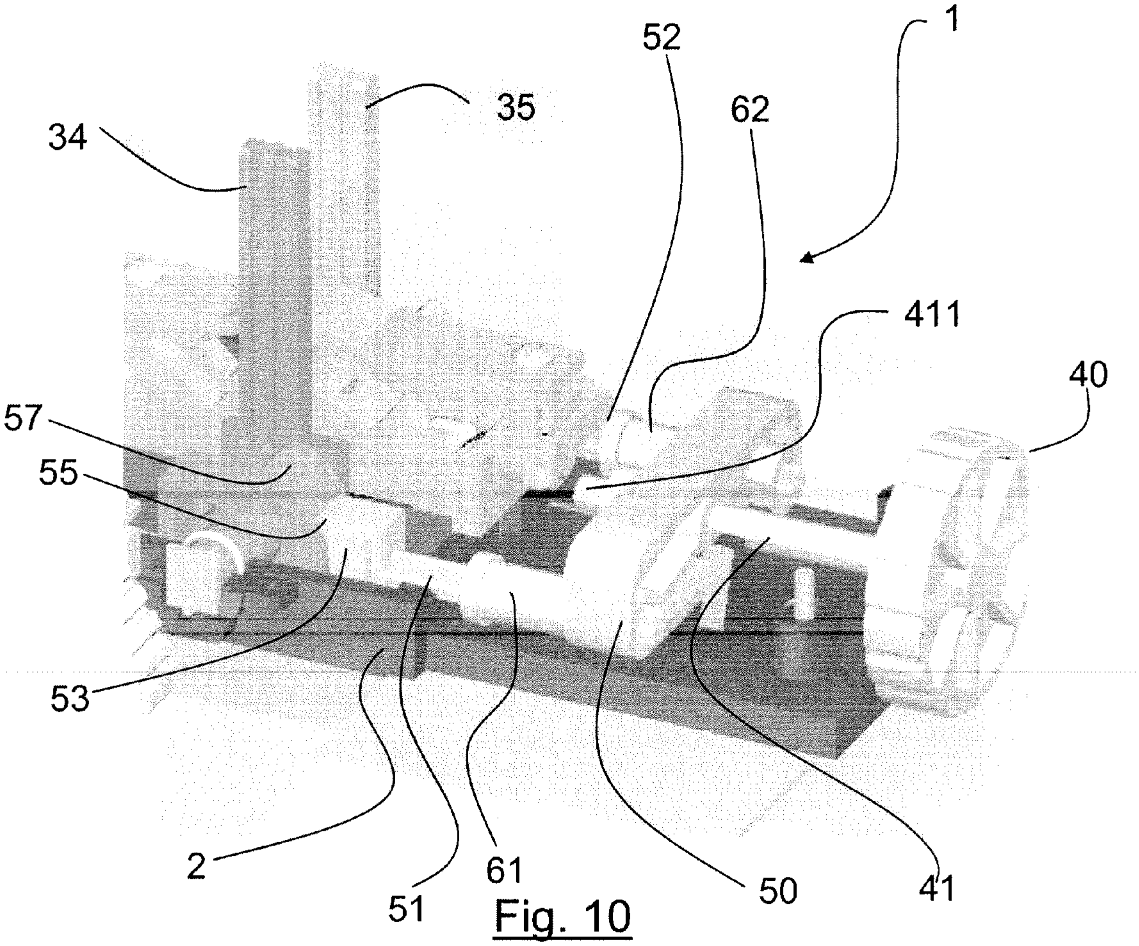
FIG. 10 is a view in perspective of a friction system, according to an embodiment of the invention.

FIG. 10 shows a particular embodiment of such means of adjustable friction which make it possible to more or less slow down the displacement of the two arms 34, 35. A thumbwheel 40, accessible in the front of the controller, allows the user to mechanically increase or decrease the force of friction applied on the arms 34, 35. This thumbwheel 40 can rotate in relation to the base 2 of the controller, and acts on a shaft 41. The end of this shaft 41 of this thumbwheel 40 is threaded, forming a worm screw 411, and carries a slide 50.

This slide 50 is in a link with two pistons 51 and 52 (in the case where there are two handles) each carrying a jaw (jaw 53 associated with the piston 51, the jaw associated to the piston 52 not being visible in the figure). This jaw 53 supports a rubber pad 55 intended to enter into contact with the arm 34.

The pad 55 can have a concave shape, cooperating with a friction zone of convex shape 57 integral with the arm 34, in the manner of a hybrid combination of a vice comprising only one mobile jaw and a railroad shoe-brake.

As such, there is a worm screw mechanism 411 which displaces the slide 50 linked with the pistons 51, 52 in order to apply in an absorbed manner the pads of the jaws on a friction zone of the arms. The pistons 51, 52 are mounted slidingly in relation to the slide 50, and are separated from the latter by one of the elastic parts 61, 62, which can be, for example coiled springs. The elastic part 61 acts in compression between the slide 50 and a shoulder formed on the piston 51. The elastic part 62 acts in compression between the slide 50 and a shoulder formed on the piston 52.

Each of said elastic parts 61, 62 exerts on a shoulder formed respectively on the pistons 51, 52 a pressure that is substantially proportional to the number of turns of the screw, and therefore to the turns applied by the thumbwheel. The jaw of each piston as such exerts this pressure on the friction zone of the arm.

Other means of adjusting the friction can of course be considered, for example using one or several cams that can apply a variable force on the arm or arms.

Figure 11:
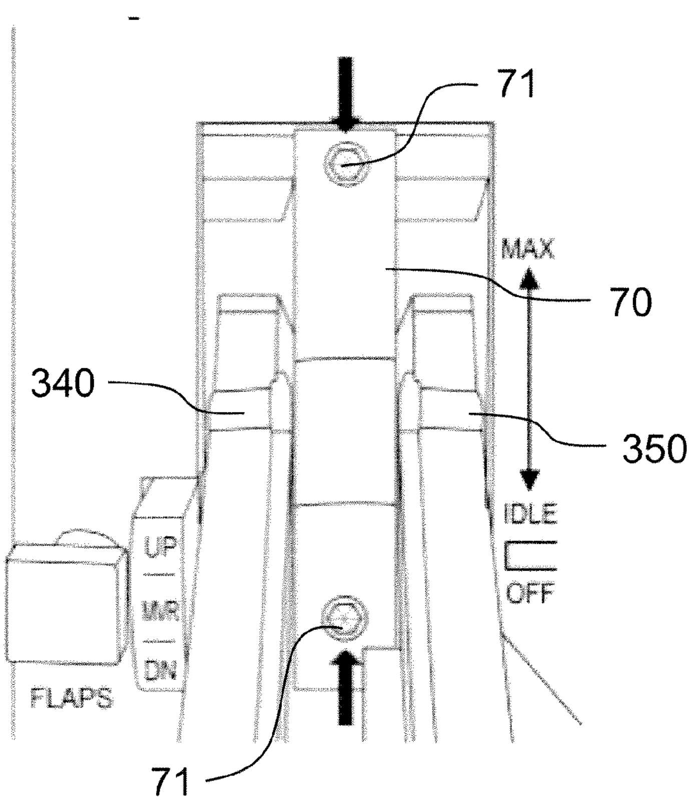
FIG. 11 is a view showing the two arms of the controller according to a particular embodiment of the invention.
Figure 12:
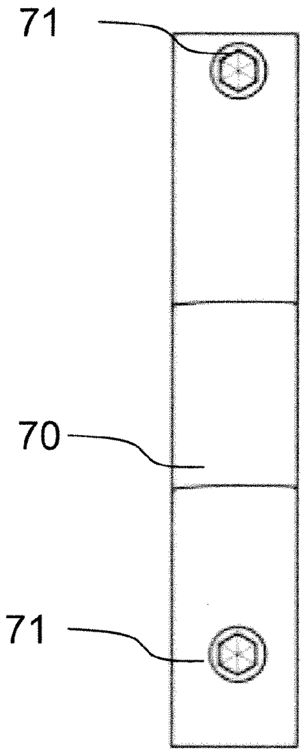
FIG. 12 is a view showing the removable bar located between the two arms of the controller of FIG. 11.

FIG. 11 is a view of the two mobile arms 340, 350 of the controller according to a particular embodiment of the invention. A removable bar 70 (which is represented on its own on FIG. 12) is fixed by screws on the base between these two arms 340, 350.

Figure 13:
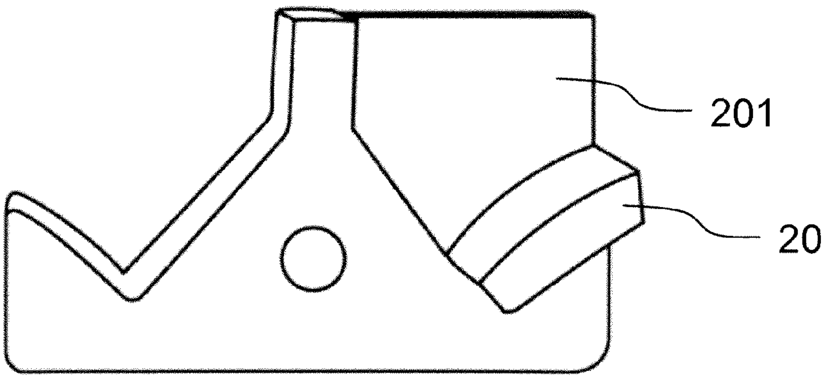
FIG. 13 illustrates another example of a removable and reversible stopping mechanism (the stopping mechanism is represented here when removed from the base)

FIG. 13 illustrates the profile of the afterburner second stop 20 according to another embodiment. This stop, which is removable and reversible, is located underneath the bar 70, in a housing of the base located between the two arms 340, 350. The bar 70 forms a removable hood for the rail 80 and the stop 20 (the bar also prevents the inopportune removal of the stop 20 from its housing). To access the stop, it is necessary to remove first the bar 70 by unscrewing beforehand the two screws 71 using an Allen Key in this example.

Figure 14:
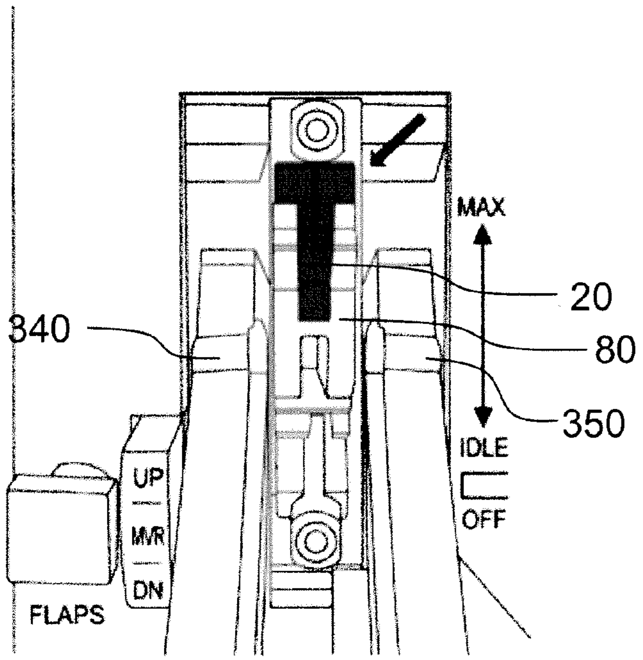
FIG. 14 illustrates the mounting in an inactive position of the removable and reversible stopping mechanism of FIG. 13 in the base between the two arms of FIG. 11.

FIG. 14 illustrate the mounting by default in an inactive position of the stop 20 of FIG. 13 between the two arms 340, 350 of FIG. 11. The stop 20 is located in its housing which is situated between the two arms 340, 350 and arranged in the rail 80. The end of the stop which is the less high is thus located at a height equal (it is level) or slightly inferior to the height of the surface forming the rail 80. In other words, the top surface of the end of the stop 20 which is the less high is located at the same level than the surface of the rail 80 (as a consequence, the lugs of the arms 340, 350 thus cannot come into contact with this end during the rotation of the arms).

The stop 20 comprises a grasping surface or zone, in the form of a vertical plane, which facilitates its removal by the player from the base (or its insertion in the base). To do so, the player pinches the vertical plane 201 between two of his fingers and removes the stop 20.

As it is represented on FIG. 13, the stop 20 is located outside the housing of the base located between the two arms 340, 350 of FIG. 11, and is thus inactive.

Figure 15:
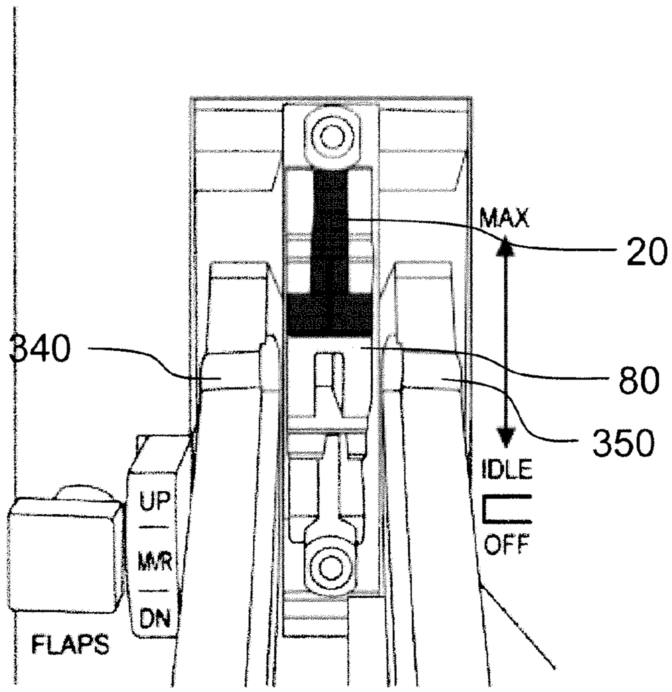
FIG. 15 illustrates the mounting in an active position of the removable and reversible stopping mechanism of FIG. 13 in the base between the two arms of FIG. 11.

FIG. 15 illustrates the mounting of the stop of FIG. 13 in an active position in the housing located between the two arms 340, 350 of FIG. 11.

In order to pass from the inactive position of FIG. 14 to the active position of FIG. 15, the user extracts the retractable stop (by pulling on the grasping zone 201 illustrated on FIG. 13), pivots it 180 degrees around a vertical axis and reintroduces it into its housing (which is located between the two arms 340, 350 and arranged in the rail 80) in such a manner that it is its higher end that is present in relation to the surface of the rail 80 (so that the end of the stop 20 sticks out in relation to the surface of the rail 80 and thus the lugs of the arms 340, 350 may come into contact against this part of this end sticking out when the anus are rotated).

In order to pass from the inactive position of FIG. 13 to the active position of FIG. 15, if need be, the removable bar illustrated on FIG. 11 as it is mounted between the two arms 340, 350, is first unscrewed by loosening the screws 71, then removed, then kept aside. The stop 20 is inserted in its housing (which is located between the two arms 340, 350 and arranged in the rail 80) in such a manner that it is its higher end that is present in relation to the surface of the rail 80 (so that the end of the stop 20 sticks out in relation to the surface of the rail 80 and thus the lugs of the arms 340, 350 may come into contact against this part of this end sticking out when the arms are rotated). The removable bar 70 can then be reinstalled and screwed between the two arms 340, 350 by tightening the screws 71.

Advantageously, the width of the vertical plane 201 is sufficiently low so that the respective lug of the mobile arms 340, 350 does not come into contact against this plane 201, including during the crossing of the stop 20 (the latter being in an active position) when the player wishes to position the arms 340, 350 in the afterburner position (between the stop intermediate position and the extreme maximal acceleration position).

In other words, the width of the vertical plane 201 is chosen so that the lugs of the mobile arms 340, 350 go past each side of the vertical plane 201 without coming into contact with this plane 201.

The invention claimed is:

1. Game controller having at least one arm mobile in relation to a base, over a nominal range of displacement between two extreme positions, referred to as minimum position and maximum position respectively, characterized in that it implements at least one stopping mechanism of said at least one arm in an intermediary locking position, between said extreme positions, having a first contact surface integral with said base able to cooperate with a second contact surface integral with said at least one arm, in such a way as to define a reduced range of displacement of said at least one arm in relation to said nominal range of displacement, and means of crossing said intermediary locking position, able to take at least two states:

a stop-state, wherein said first and second contact surfaces come into contact with each other, in said intermediary locking position;

a crossed-state of said intermediary locking position, wherein said first and second contact surfaces are separated from each other by a predetermined action of a user, in order to allow said at least one arm to be displaced over an additional range of displacement of said reduced range of displacement, and in that at least one of said contact surfaces is formed over a removable and/or retractable element that is able to take two positions, an active position, wherein said at least one stopping mechanism in said intermediary locking position is active, and an inactive position, wherein said at least one stopping mechanism is inactive.

2. Game controller according to claim 1, characterised in that said removable and/or retractable element is mounted reversibly in said base.

3. Game controller according to claim 1, characterised in that said second contact surface is mobile according to an axis parallel to an axis defined by said at least one arm.

4. Game controller according to claim 3, characterized in that said at least one arm comprises two portions connected by a slide joint, a first portion corresponding to a shaft of said at least one arm and a second portion carrying an actuating element of said means of crossing, allowing for the switching from said stop-state to said crossed-state, means of recalling tending to return said means of crossing into said stop-state.

5. Game controller according to claims 1, characterised in that said at least one aim is mounted mobile in rotation in relation to said base.

6. Game controller according to claims 1, characterized in that said at least one arm is mounted mobile in translation in relation to said base.

7. Game controller according to claims 1, characterised in that said second contact surface is formed by one of the elements belonging to the group including:

a portion of the corps of said at least one arm;
a lug formed on said at least one arm;
a bolt carried by said at least one arm;
a latch carried by said at least one arm;
a roller integral with said at least one arm;
a portion integral with said base;
a lug formed on said base;
a bolt carried by said base;
a latch carried by said base;
a roller integral with said base.

8. Game controller according to claims 1, characterized in that it comprises, for said at least one arm, two stopping mechanisms.

9. Game controller according to claim 8 characterized in that it comprises:

a first stopping mechanism which consists in a stop in the vicinity of said minimum position corresponding to a simulation of a stopping of engines of a simulated vehicle, and making it possible to avoid the simulation of an untimely ignition and/or extinction of the engines;

a second stopping mechanism which consists in a stop in the vicinity of said maximum position, making it possible to simulate a post-combustion.

10. Game controller according to claim 1, characterized in that it comprises, for said at least one arm, a Hall Effect movement detection unit for detecting the movement of said at least one arm.

11. Game controller according to claim 1, characterised in that it comprises means of applying a force by friction on said at least one arm, opposing the displacement of the latter.

12. Game controller according to claim 11, characterised in that said means of applying a force by friction can be adjusted.

13. Game controller according to claim 1, characterised in that it comprises two arms, and means for rendering said arms integral/non-integral, in such a way that their displacements can be linked or independent.

14. Game controller according to claim 1, characterised in that said removable and/or retractable element comprises at least one grasping zone.

* * * * *

UNITED STATES PATENT AND TRADEMARK OFFICE

CERTIFICATE OF CORRECTION

PATENT NO. : 8,696,460 B2
APPLICATION NO. : 13/034890
DATED : April 15, 2014
INVENTOR(S) : Catherine Odinot, Guillaume Leleve and Patrick Pennaneac'h It is certified that error appears in the above-identified patent and that said Letters Patent is hereby corrected as shown below:

In the Claims

Column 12, Claim 5, line 28, please delete "aim" and insert --arm--.

Signed and Sealed this
Twenty-eighth Day of October, 2014

Michelle K. Lee
*Deputy Director of the United States Patent and Trademark Office*